US012601312B2

(12) United States Patent
Jakubek

(10) Patent No.: US 12,601,312 B2
(45) Date of Patent: Apr. 14, 2026

(54) WARM GAS THRUSTER SYSTEM WITH CONTROL VALVE THAT HAS A SOFT SEAL

(71) Applicant: AEROJET ROCKETDYNE, INC., Melbourne, FL (US)

(72) Inventor: Matthew T. Jakubek, Seattle, WA (US)

(73) Assignee: AEROJET ROCKETDYNE, INC., Melbourne, FL (US)

( * ) Notice: Subject to any disclaimer, the term of this patent is extended or adjusted under 35 U.S.C. 154(b) by 84 days.

(21) Appl. No.: 18/421,427

(22) Filed: Jan. 24, 2024

(65) Prior Publication Data

US 2025/0237183 A1　　Jul. 24, 2025

(51) Int. Cl.
| | |
|---|---|
| *F02K 9/44* | (2006.01) |
| *F02K 9/42* | (2006.01) |
| *F02K 9/56* | (2006.01) |
| *F02K 9/58* | (2006.01) |
| *F02K 9/60* | (2006.01) |
| *F02K 9/68* | (2006.01) |
| *F02K 9/97* | (2006.01) |
| *F16K 25/00* | (2006.01) |

(52) U.S. Cl.
CPC ................. *F02K 9/44* (2013.01); *F02K 9/42* (2013.01); *F02K 9/425* (2013.01); *F02K 9/56* (2013.01); *F02K 9/58* (2013.01); *F02K 9/605* (2013.01); *F02K 9/68* (2013.01); *F02K 9/972* (2013.01); *F16K 25/005* (2013.01)

(58) Field of Classification Search
CPC ..... F02K 9/42; F02K 9/44; F02K 9/56; F02K 9/58; F02K 9/605; F02K 9/68; F02K 9/425; F02K 9/972; F16K 25/005
See application file for complete search history.

(56) References Cited

U.S. PATENT DOCUMENTS

| | | | | |
|---|---|---|---|---|
| 4,930,310 | A * | 6/1990 | McKevitt ................. | F02K 9/50 60/770 |
| 5,207,399 | A * | 5/1993 | Risberg ................. | B64G 1/402 137/340 |
| 11,148,833 | B1 * | 10/2021 | Wu ........................ | B64G 1/405 |
| 2023/0037400 | A1 * | 2/2023 | Pietik?inen ............ | B64G 1/402 |
| 2024/0025567 | A1 * | 1/2024 | Kokorich ............... | F24S 50/20 |
| 2024/0263599 | A1 * | 8/2024 | Sidhu ..................... | B64G 1/401 |

OTHER PUBLICATIONS

Gilroy, R. G., Spaceshuttlesealmaterial and Design Development for Earth Storable Propellant Systems, NASA (Year: 1973).*

* cited by examiner

*Primary Examiner* — Kyle Robert Thomas
(74) *Attorney, Agent, or Firm* — Carlson, Gaskey & Olds, P.C.

(57) ABSTRACT

A thruster system includes a tank for holding liquid propellant, a catalyst bed connected with the tank and operable to decompose the liquid propellant and generate a gas, a plenum connected with the catalyst bed for receiving the gas, a heat exchanger connected with the plenum to cool the gas to a temperature below a threshold temperature and thereby generate a cooled gas, at least one thruster connected with the heat exchanger to receive the cooled gas, and at least one control valve between the heat exchanger and the at least one thruster controlling flow of the cooled gas to the thruster. At least one control valve includes a soft material valve seal.

10 Claims, 3 Drawing Sheets

WARM GAS THRUSTER SYSTEM WITH CONTROL VALVE THAT HAS A SOFT SEAL

BACKGROUND

Space vehicles may include several different thrusters that are operable to for different types of movements. For example, there may be a primary thruster that functions for high velocity propulsion maneuvers, and one or more smaller auxiliary thrusters that function for precise, slow movements. The ability to execute small, precise movements, however, depends on the ability of the auxiliary thruster to provide small, e.g., micro, impulse bits, which is the smallest impulse that a thruster can reproducibly deliver.

SUMMARY

A thruster system according to an example of the present disclosure includes a tank for holding liquid propellant, a catalyst bed connected with the tank and operable to decompose the liquid propellant and generate a gas, a plenum connected with the catalyst bed for receiving the gas, and a heat exchanger connected with the plenum. The heat exchanger is configured to cool the gas to a temperature below a threshold temperature and thereby generate a cooled gas. At least one thruster is connected with the heat exchanger to receive the cooled gas. At least one control valve is between the heat exchanger and the at least one thruster to control flow of the cooled gas to the thruster. The at least one control valve includes a soft material seal.

In a further embodiment of any of the foregoing embodiments, the soft material is AF-E-411.

In a further embodiment of any of the foregoing embodiments, the heat exchanger is a phase change material heat sink.

In a further embodiment of any of the foregoing embodiments, the heat exchanger is a phase change material heat sink includes indium.

A vehicle according to an example of the present disclosure includes a tank for holding liquid propellant, a catalyst bed connected with the tank and operable to decompose the liquid propellant and generate a gas, a plenum connected with the catalyst bed for receiving the gas, and a heat exchanger connected with the plenum. The heat exchanger is configured to cool the gas to a temperature below a threshold temperature and thereby generate a cooled gas. At least one first thruster is connected with the heat exchanger to receive the cooled gas. At least one second thruster is connected with the tank to receive the liquid propellant, wherein each at least one first thruster has a first associated impulse bit, each at least one second thruster has a second associated impulse bit, and the first impulse bit is less than the second impulse bit. There is at least one control valve between the heat exchanger and the at least one thruster to control flow of the cooled gas to the thruster. The at least one control valve includes a soft material valve seal.

In a further embodiment of any of the foregoing embodiments, the first associated impulse bit is less than 100 μlbf-sec.

In a further embodiment of any of the foregoing embodiments, the soft material valve seal is AF-E-411.

In a further embodiment of any of the foregoing embodiments, the heat exchanger is a phase change material heat sink.

In a further embodiment of any of the foregoing embodiments, the heat exchanger is a phase change material heat sink includes indium.

A method according to an example of the present disclosure includes providing a liquid propellant from a tank to a catalyst bed connected with the tank. The catalyst bed generates a gas by decomposing the liquid propellant. A plenum is charged with the gas, and provides a flow of the gas to a heat exchanger. The heat exchanger cools the gas to a temperature below a threshold temperature and thereby generates a cooled gas to flow to at least one thruster connected with the heat exchanger. At least one control valve is located between the heat exchanger and the at least one thruster to control flow of the cooled gas to the thruster. The at least one valve has a soft material valve seal, and the threshold temperature corresponds to a maximum use temperature of the soft material valve seal.

In a further embodiment of any of the foregoing embodiments, the soft material valve seal is AF-E-411.

In a further embodiment of any of the foregoing embodiments, the heat exchanger is a phase change material heat sink.

In a further embodiment of any of the foregoing embodiments, the heat exchanger is a phase change material heat sink includes indium.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
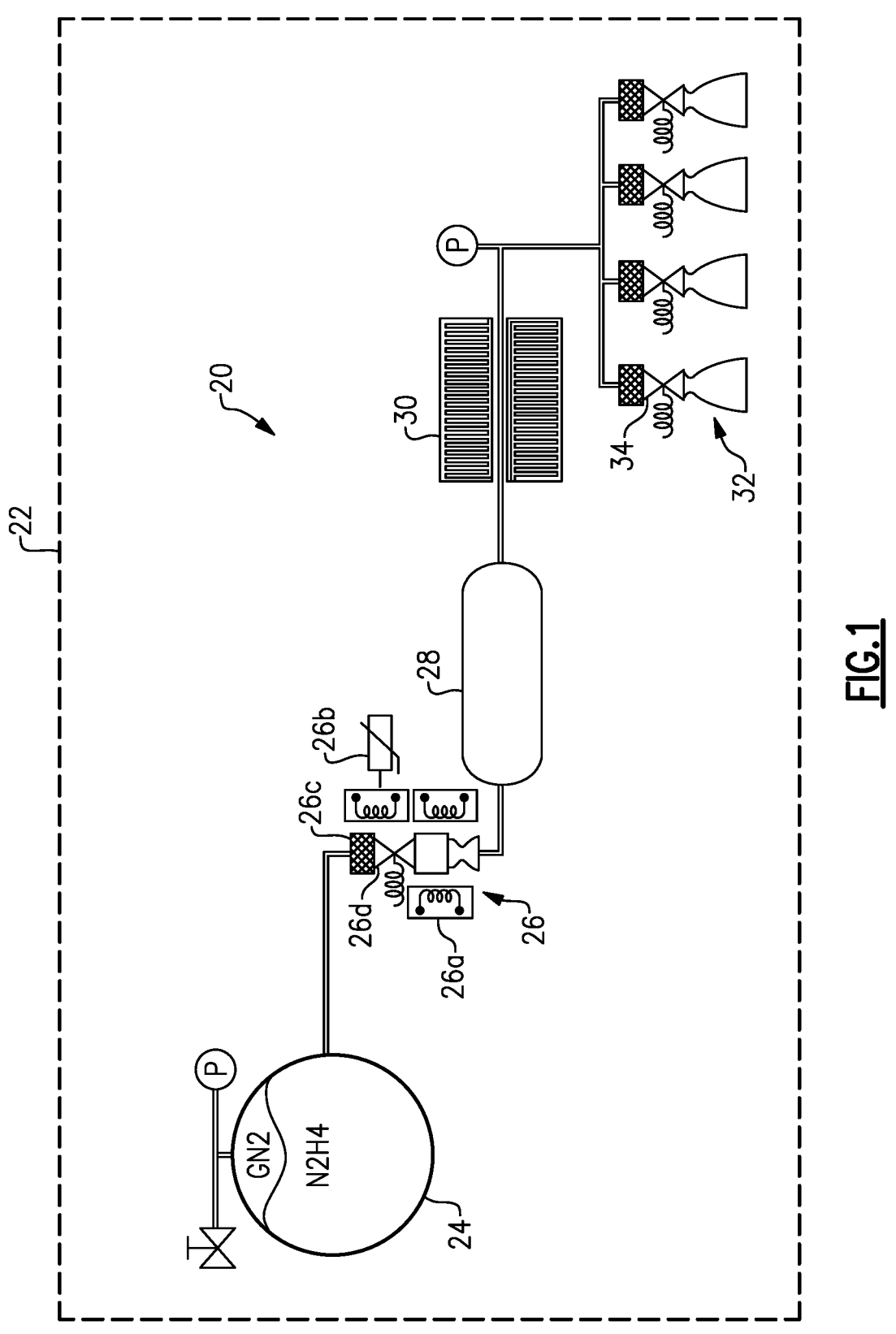
FIG. 1 illustrates a thruster system.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates an example of a thruster system 20. The thruster system 20 is part of a vehicle 22. It is to be appreciated that not all of the systems of the vehicle 22 are shown, and the vehicle 22 may additionally include, for example, one or more additional thrusters and related hardware. For example, the vehicle 22 is a space vehicle, such is but not limited to, a telescope, a satellite, or other space vehicle that would benefit from super-fine micro-impulse control.

In the illustrated example, the thruster system 20 includes a tank 24 for holding liquid propellant, such as hydrazine. The tank 24 is connected with a catalyst bed 26, which is operable to decompose the liquid propellant and generate a gas. Catalysts for hydrazine and other liquid propellants are known, such as but not limited to, supported iridium catalysts. The catalyst bed 26 (e.g., a catalyst system) in addition to a catalyst may include one or more heater elements 26a, a thermistor 26b, a filter 26c, and a valve 26d. Unless otherwise stated or implied, the term "connected" as used herein to describe a relation between two or more components refers to the components being fluidly connected.

The thruster system 20 further includes a plenum 28 that is connected with the catalyst bed 26 for receiving the gas. For example, the plenum 28 is a chamber that is generally larger in diameter than the lines that connect the tank 24, the catalyst bed 26, and the plenum together. There is a heat exchanger 30 connected with the plenum 28. The decomposition reaction of the liquid propellant over the catalyst bed 26 is exothermic and the resulting gases can thus initially have a temperature of 800° C. or more. The heat exchanger 30 is configured to cool the gas to a temperature below a threshold temperature and thereby generate a cooled gas. For example, the heat exchanger 30 includes a phase change material that acts as a heat sink to remove heat from the gas into the ambient surroundings. For instance, one useful phase change material for hydrazine includes indium, which melts at approximately 157° C. The composition of the phase change material, however, can be tailored to the exit temperature of the gas from the catalyst bed 26 and the desired threshold temperature below which the gas is to be cooled.

There is at least one thruster 32 connected downstream of the heat exchanger to receive the cooled gas. In the illustrated example, there are four such thrusters, although there could alternatively be one, two, three, or more than four thrusters 32. There is a control valve 34 between the heat exchanger 30 and each one of the thrusters 32. For example, for four thrusters 32 there are four control valves 34. Each control valve 34 controls flow of the cooled gas to the respective thruster 32. The control valves 34 are connected to a control device, such as a microprocessor, that controls opening and closing of the control valve 34 with respect to a desired amount of thrust to be provided by the release of the cooled gas through the respective thruster 32.

Figure 2:
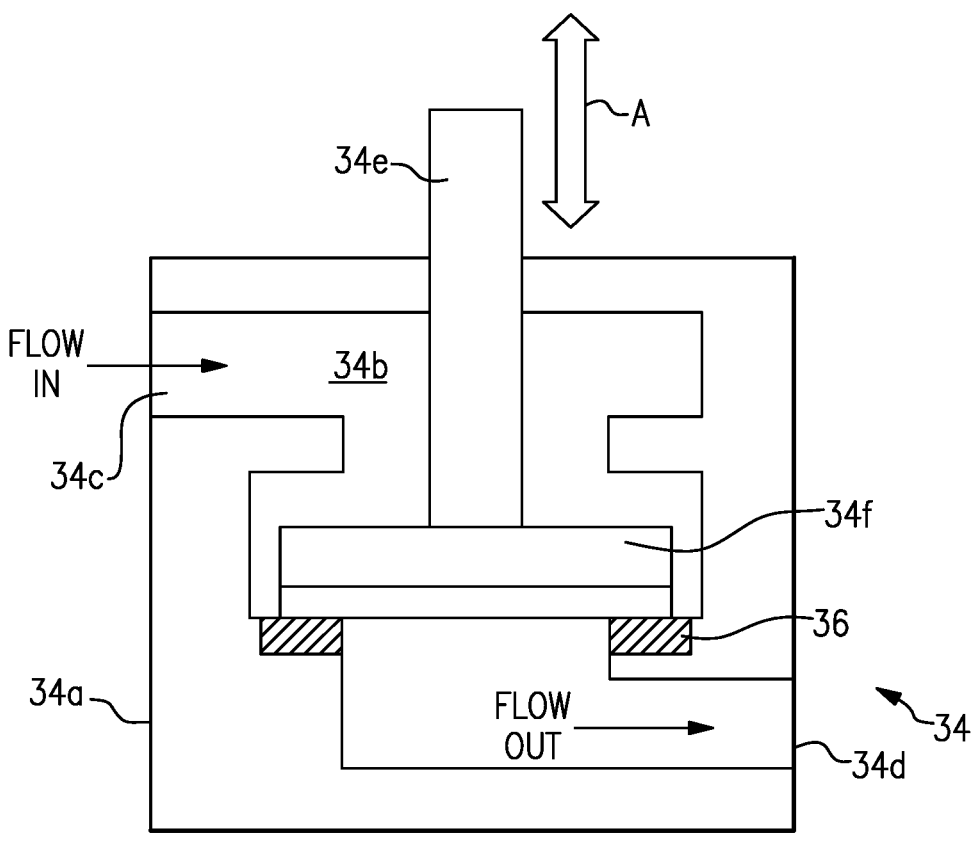
FIG. 2 illustrates an example of a control valve.

FIG. 2 illustrates a representative example of one of the control valves 34. The control valve 34 includes a valve body 34a that defines a flow passage 34b between an inlet 34c and an outlet 34d. There is a valve armature 34e that has a valve head 34f disposed in the flow passage 34b. The valve armature 34e is moveable as indicated by arrow A to move the valve head 34f with respect to a valve seal 36. The valve head 34f abuts and seals against the valve seal 36 when the valve is in a closed position, to block flow through the passage 34b. The valve head 34f is displaced from the valve seal 36 when the valve is in an open position, to allow flow through the passage 34b.

The valve seal 36 is formed of a soft material. The soft material is a flexible non-metallic material. Soft materials have a low hardness (e.g. hardness of less than 100 Shore A). Soft materials include elastomers and plastic material. Relevant materials include Neoprene, Butyl, Nitrile, Silicone, EPT, EPDM, EPR, FFKM, PTFE (Teflon™), AF-E-411 The soft material valve seal 36 is elastic such that under the force of the valve head 34f against the valve seal 36, the valve seal 36 compresses and deforms against the valve head 34f in order to block leak paths through the passage 34b.

The use of the soft material as the valve seal 36 is enabled by the cooling of the gas in the heat exchanger 30. For instance, the gas is cooled to a temperature that corresponds to a maximum use temperature of the soft seal, such as below approximately 149° C. In contrast, if the gas were not cooled it would exceed the use temperature of the soft material and thus require materials with higher temperature resistance that do not seal as well. However, by ensuring that the temperature of the gas remains below the threshold, the soft material can be used for the valve seal 36 to obtain good sealing that is substantially free of leaks. A leak-free seal ensures zero thrust when the valve 34 is closed, i.e., when the thruster 32 is OFF, as well as super-fine impulse bit control. For example, the valve 34 may facilitate impulse bits of less than approximately 100 μlbf-sec.

In a further example, the plenum 28 also contributes to impulse bit control. For instance, the amount of gas, and thus the pressure, provided into the plenum 28 is controlled in order to control the magnitude of the pressure delivered to the thruster 32. For example, a relatively high pressure of gas is provided in the plenum 28 in order to produce a high impulse bit, and a relatively low pressure of gas is provided in the plenum 28 in order to produce a low impulse bit. In this regard, the plenum 28 serves as a charging plenum that is charged with a desired pressure of gas in order to produce a desired impulse at the thruster 32 or thrusters 32. Additionally, the residence time of the gas in the plenum 28 is controlled in order to further modulate the gas pressure and thus the magnitude of the gas pressure delivered to the thruster 32 or thrusters 32. As an example, a relatively long residence time is used in which the gas further cools and loses pressure, or a relatively shorter residence time is used in which the gas does not substantially cool and thus maintains pressure. Accordingly, the pressure and temperature in the plenum 28, as well as the exit temperature from the heat exchanger 30 are used to control the gas and obtain a desired impulse bit.

Figure 3:
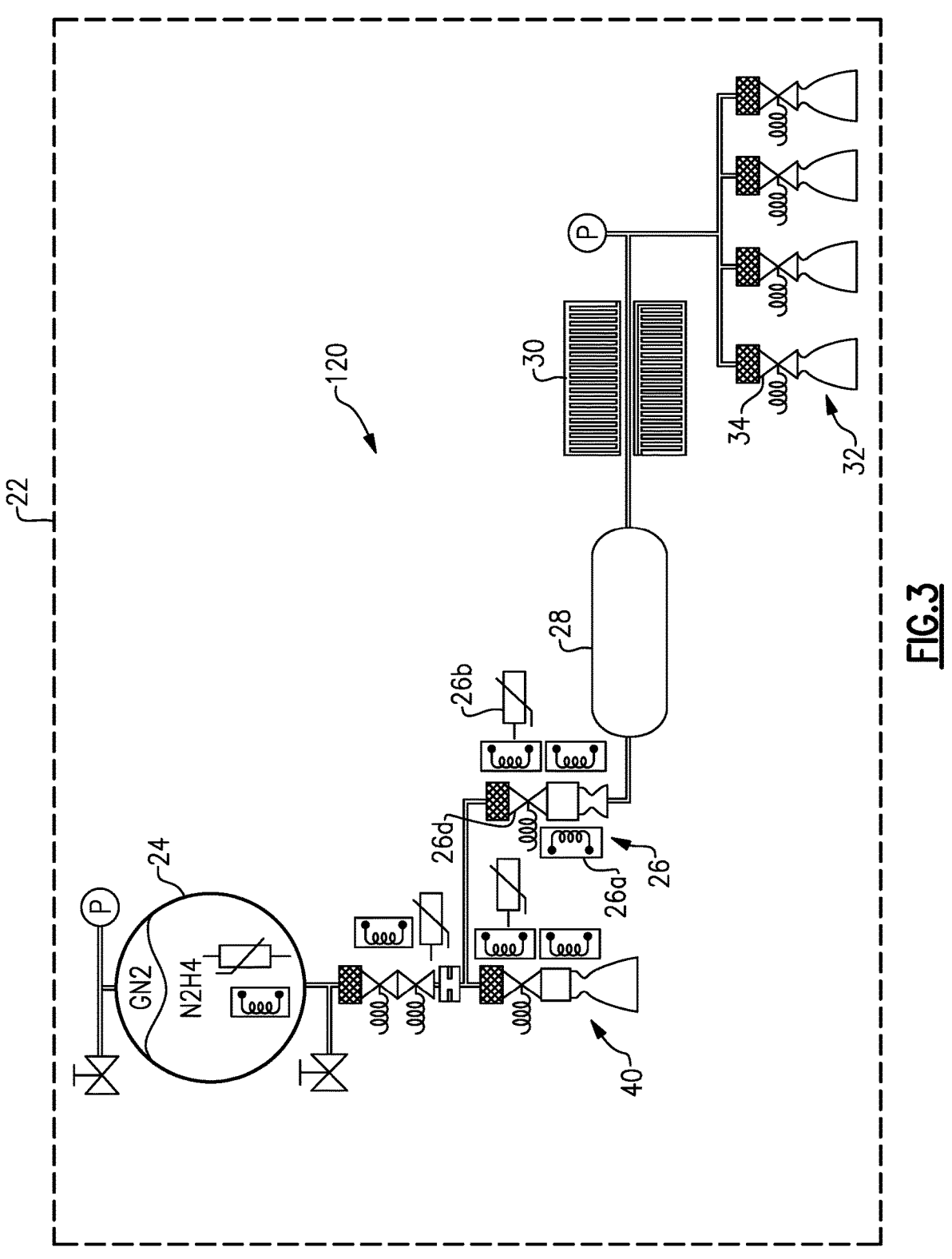
FIG. 3 illustrates another example thruster system.

FIG. 3 illustrates another example thruster system 120 that is the same as the above-described system 20 except that there is an additional, primary thruster 40 also connected with the tank 24. For instance, the primary thruster 40 is a high specific impulse thruster that has a substantially greater specific impulse than each of the thrusters 32. In this regard, the primary thruster 40 serves for high velocity propulsive maneuvers, while the smaller gas thrusters 32 serve for fine pointing and/or slow controlled displacements.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A thruster system comprising:
a tank for holding liquid propellant;
a catalyst bed connected with the tank and operable to decompose the liquid propellant and generate a gas;
a plenum connected with the catalyst bed for receiving the gas;
a heat exchanger connected with the plenum, the heat exchanger including a phase change material configured to remove heat from the gas into ambient surroundings of the heat exchanger to cool the gas to a temperature below a threshold temperature and thereby generate a cooled gas;

at least one thruster connected with the heat exchanger to receive the cooled gas;

at least one control valve between the heat exchanger and the at least one thruster controlling flow of the cooled gas to the thruster, the at least one control valve including a soft material seal; and wherein the threshold temperature corresponds to a maximum use temperature of the soft material seal.

2. The system as recited in claim 1, wherein the soft material is AF-E-411.

3. The system as recited in claim 1, wherein the phase change material heat includes indium.

4. A vehicle comprising:

a tank for holding liquid propellant;

a catalyst bed connected with the tank and operable to decompose the liquid propellant and generate a gas;

a plenum connected with the catalyst bed for receiving the gas;

a heat exchanger connected with the plenum, the heat exchanger including a phase change material configured to remove heat from the gas into ambient surroundings of the heat exchanger to cool the gas to a temperature below a threshold temperature and thereby generate a cooled gas;

at least one first thruster connected with the heat exchanger to receive the cooled gas;

at least one second thruster connected with the tank to receive the liquid propellant, wherein each at least one first thruster has an first associated impulse bit, each at least one second thruster has a second associated impulse bit, and the first impulse bit is less than the second impulse bit;

at least one control valve between the heat exchanger and the at least one thruster controlling flow of the cooled gas to the thruster, the at least one control valve including a soft material valve seal; and wherein the threshold temperature corresponds to a maximum use temperature of the soft material seal.

5. The vehicle as recited in claim 4, wherein the first associated impulse bit is less than 100 μlbf-sec.

6. The vehicle as recited in claim 4, wherein the soft material valve seal is AF-E-411.

7. The vehicle as recited in claim 4, wherein the phase change material heat includes indium.

8. A method comprising:

providing a liquid propellant from a tank to a catalyst bed connected with the tank, the catalyst bed generating a gas by decomposing the liquid propellant;

charging a plenum with the gas;

providing a flow of the gas from the plenum to a heat exchanger connected with the plenum, the heat exchanger including a phase change material removing heat from the gas into ambient surroundings of the heat exchanger to cool the gas to a temperature below a threshold temperature and thereby generating a cooled gas;

providing a flow of the cooled gas from the heat exchanger to at least one thruster connected with the heat exchanger; and using at least one control valve between the heat exchanger and the at least one thruster to control flow of the cooled gas to the thruster, the at least one valve has a soft material valve seal and the threshold temperature corresponds to a maximum use temperature of the soft material valve seal.

9. The method as recited in claim 8, wherein the soft material valve seal is AF-E-411.

10. The method as recited in claim 8, wherein the phase change material heat includes indium.

* * * * *